(12) United States Patent
Weitzel et al.

(10) Patent No.: US 12,491,052 B2
(45) Date of Patent: Dec. 9, 2025

(54) DENTAL COMPONENTS AND METHODS TO ALIGN DENTAL COMPONENTS

(71) Applicant: Nobel Biocare Services AG, Kloten (CH)

(72) Inventors: Jorg Weitzel, Rielasingen-Worblingen (DE); Urs Weber, Olten (CH); Ibrahim Unal, Effretikon (CH); Marcel Siegfried, Glattpark (CH)

(73) Assignee: Nobel Biocare Services AG, Kloten (CH)

( * ) Notice: Subject to any disclaimer, the term of this patent is extended or adjusted under 35 U.S.C. 154(b) by 49 days.

(21) Appl. No.: 17/620,937

(22) PCT Filed: Jun. 23, 2020

(86) PCT No.: PCT/EP2020/067504
§ 371 (c)(1),
(2) Date: Dec. 20, 2021

(87) PCT Pub. No.: WO2020/260283
PCT Pub. Date: Dec. 30, 2020

(65) Prior Publication Data
US 2022/0323184 A1    Oct. 13, 2022

(30) Foreign Application Priority Data

Jun. 25, 2019    (EP) .................... 19182292

(51) Int. Cl.
*A61C 8/00* (2006.01)
*A61C 9/00* (2006.01)
*A61C 13/10* (2006.01)

(52) U.S. Cl.
CPC .......... *A61C 8/0066* (2013.01); *A61C 8/0001* (2013.01); *A61C 8/0037* (2013.01); *A61C 9/0053* (2013.01); *A61C 13/10* (2013.01)

(58) Field of Classification Search
CPC ..... A61C 8/00; A61C 13/2656; A61C 8/0066; A61C 8/0001; A61C 8/0037; A61C 9/0053; A61C 13/10
See application file for complete search history.

(56) References Cited

U.S. PATENT DOCUMENTS 7,066,736 B2    6/2006  Kumar et al.
2002/0106610 A1*  8/2002  Hurson .................... A61C 9/00
                                                 433/172

(Continued)

FOREIGN PATENT DOCUMENTS

CN    101505678 A    8/2009
CN    109789002      5/2019

(Continued)

OTHER PUBLICATIONS

International Search Report issued in International Patent Application No. PCT/EP2020/067504, mailed Sep. 1, 2020 in 4 pages.

*Primary Examiner* — Eric J Rosen
*Assistant Examiner* — Hao D Mai
(74) *Attorney, Agent, or Firm* — Knobbe, Martens, Olson & Bear, LLP

(57) ABSTRACT

A system can be configured to record a position and orientation of a dental component. The system can include a coping and a replica. The coping can include an anti/rotational feature that is configured to mate with an anti-rotational feature of a dental component. The coping can also include an orientation feature that is configured to convey the orientation of the dental component. The replica can include a first anti-rotational feature that corresponds to the anti-rotational feature of the dental component. The replica can also include a second anti-rotational feature that does not correspond to the anti-rotational feature of the dental component.

19 Claims, 9 Drawing Sheets

(56) References Cited

U.S. PATENT DOCUMENTS

| | | | |
|---|---|---|---|
| 2004/0101806 A1 | 5/2004 | Kumar et al. | |
| 2004/0101807 A1 | 5/2004 | Porter et al. | |
| 2006/0099549 A1* | 5/2006 | Engman | A61C 8/0001 433/173 |
| 2006/0141419 A1* | 6/2006 | Heo | A61C 8/0069 433/201.1 |
| 2008/0057476 A1* | 3/2008 | Zettler | A61C 8/0066 433/173 |
| 2010/0112520 A1 | 5/2010 | Worthington | |
| 2010/0209877 A1* | 8/2010 | Hogan | A61C 8/0001 433/214 |
| 2011/0129792 A1* | 6/2011 | Berckmans, III | A61B 6/145 703/1 |
| 2011/0306014 A1* | 12/2011 | Conte | A61C 8/0001 433/214 |
| 2012/0202173 A1* | 8/2012 | Seo | A61C 5/70 433/220 |
| 2013/0209960 A1* | 8/2013 | Benhamou | A61C 8/0022 433/201.1 |
| 2014/0205969 A1* | 7/2014 | Marlin | A61C 8/0012 433/196 |
| 2016/0213451 A1* | 7/2016 | Burger | A61C 8/0054 |
| 2017/0027667 A1 | 2/2017 | Thomé et al. | |
| 2017/0112598 A1* | 4/2017 | Suttin | A61C 8/006 |
| 2022/0387145 A1* | 12/2022 | Spindler | A61C 8/0069 |
| 2023/0248479 A1* | 8/2023 | Khoury | A61C 8/0048 433/174 |

FOREIGN PATENT DOCUMENTS

| | | |
|---|---|---|
| KR | 10-2006-0025263 A | 3/2006 |
| KR | 101 452 849 B1 | 10/2014 |
| WO | WO 2018/150067 A1 | 8/2018 |

* cited by examiner

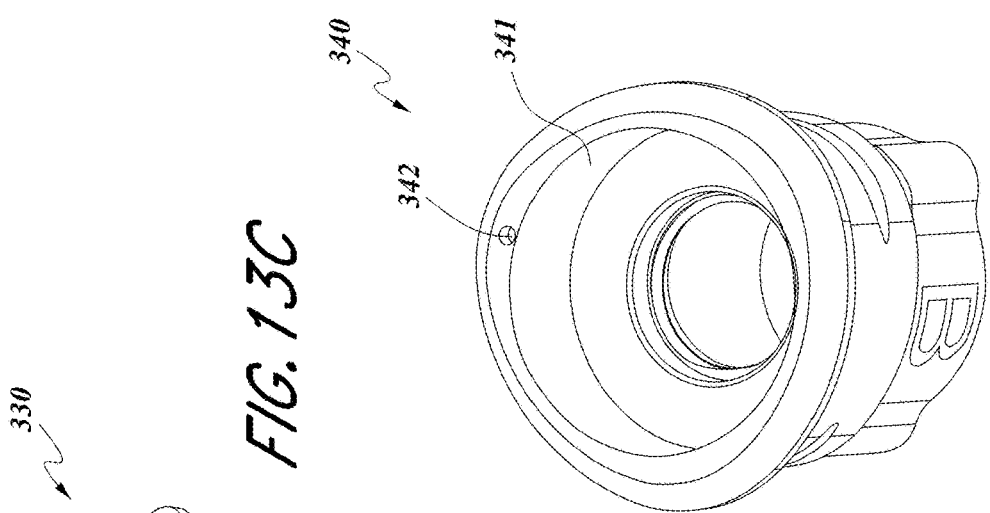
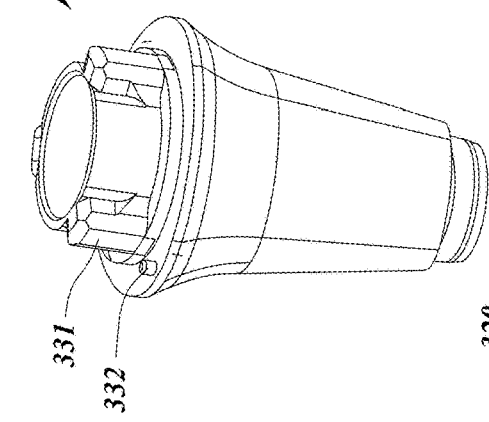
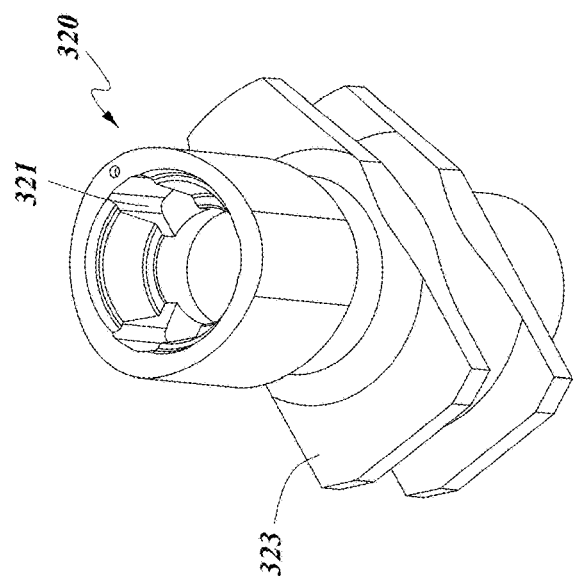
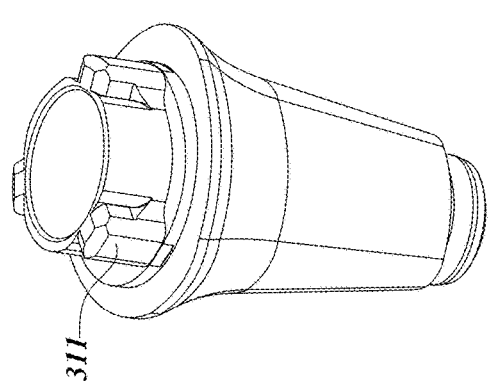

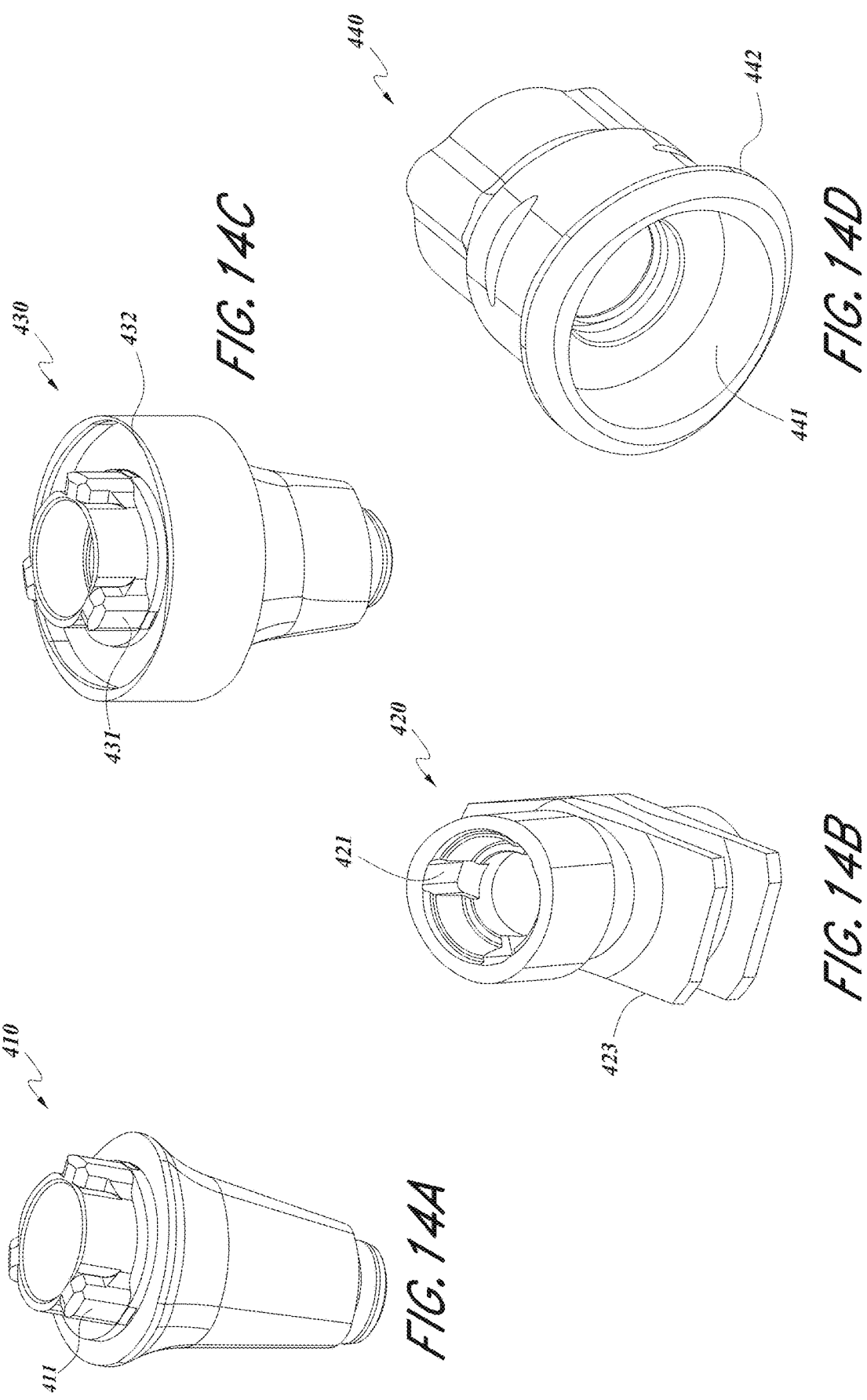

DENTAL COMPONENTS AND METHODS TO ALIGN DENTAL COMPONENTS

CROSS-REFERENCE TO RELATED APPLICATIONS

This application is a national stage application under 35 U.S.C. § 371 of International Application No. PCT/EP2020/067504, filed on Jun. 23, 2020, which published in English as WO 2020/260283 A1 on Dec. 30, 2020, and which claims priority benefit of EP patent application Ser. No. 19/182,292.3, filed on Jun. 25, 2019.

BACKGROUND

Field

The present disclosure relates to dental components and methods to align dental components.

Description of the Related Art

Dental prosthetic systems can include components such as a dental implant, an intermediate component such as an abutment, and a prosthesis such as a crown or bridge. An impression or scan of the implant site can be used to record information of the implant within the patient's mouth to help fabricate the prosthesis and/or an intermediate component. In some instances, a coping (e.g., an impression coping or a scan body) can be mated with the dental implant or intermediate component to help record the position and orientation of the implant or intermediate component in the patient's mouth.

For implants and/or abutments with a non-round interface or outer shape, it can be desirable to know the rotational position of an underlying component so that the upper component can be registered (e.g., aligned) with the underlying component. In other words, to be able to align the non-round interface or outer shape of the upper component with the non-round interface or outer shape of the underlying component. For some components, such as a bridge, mating with an underlying non-round component can be complicated because it is also desirable to provide non-engaging surfaces that can allow some "play" between the bridge and the underlying component.

SUMMARY

Provided are various dental components. Provided are also systems and methods to align dental components. In some implementations, the systems and methods can be used to create upper components (e.g., a crown or bridge) that do not engage the underlying components (e.g., an intermediate component or an implant), but yet can be aligned with the orientation of the underlying component.

In certain implementations, a system can be configured to record a position and orientation of a dental component. The system can include a coping and a replica. The coping can include an anti-rotational feature that is configured to mate with an anti-rotational feature of a dental component. The coping can also include an orientation feature that is configured to convey the orientation of the dental component. The replica can include a first anti-rotational feature that corresponds to the anti-rotational feature of the dental component. The replica can also include a second anti-rotational feature that does not correspond to the anti-rotational feature of the dental component.

In some instances, the coping can comprise an impression coping that is configured to be embedded in an impression medium to record the position and orientation of the dental component. In some instances, the coping can comprise a scan body that is configured to be scanned to record the position and orientation of the dental component.

In various implementations, the coping can include an external surface comprising the orientation feature. The coping can also include an internal surface comprising the anti-rotational feature. In some instances, the orientation feature and/or the anti-rotational feature of the coping can comprise a protrusion, a recess, a pin, or a groove.

In some instances, the second anti-rotational feature of the replica can be positioned on the first anti-rotational feature of the replica. In some instances, the second anti-rotational feature of the replica can be positioned on a surface configured to mate with an adjacent component. The adjacent component can comprise the coping, an abutment, and/or a prosthesis. In some instances, the first anti-rotational feature and/or the second anti-rotational feature of the replica can comprise a protrusion, a recess, a pin, or a groove.

In some implementations, the system can further comprise the dental component. The dental component can comprise a dental implant or an adapter configured to mate with the dental implant.

In various implementations, the system can be configured to align the dental component with another dental component. The dental components can have non-circular outer cross-sectional interfaces. For example, the non-circular outer cross-sectional interfaces can include trioval or quadrioval interfaces. In some implementations, the system can further comprise the other dental component. The other dental component can be configured to mate with the second anti-rotational feature of the replica, but not with the first anti-rotational feature of the replica. The other dental component can comprise an abutment and/or a prosthesis.

In certain implementations, a method of fabricating a second dental component that is configured to align with a first dental component in a patient's mouth can be provided. The method can include mating a replica with a coping. The coping can have an orientation feature that has been recorded with respect to the first dental component to convey the position and orientation of the first dental component in the patient's mouth. The replica can comprise a first anti-rotational feature that corresponds to an anti-rotational feature of the first dental component. The replica can further comprise a second anti-rotational feature that does not correspond to the anti-rotational feature of the first dental component. The method can also include forming a model of at least a part of the patient's mouth adjacent the replica mated with the coping. The method can also include unmating the coping from the replica. The method can further include creating the second dental component such that the second dental component is configured to mate with the second anti-rotational feature of the replica, but not with the first anti-rotational feature of the replica.

In various implementations, the method can further comprise mating the coping with the first dental component. The coping can comprise an anti-rotational feature configured to mate with the anti-rotational feature of the first dental component. The method can further comprise recording the orientation feature of the coping mated with the first dental component to record the position and orientation of the first dental component. The method can also include unmating the coping from the first dental component.

In some methods, the orientation feature has been recorded by embedding the orientation feature in an impression medium. In some methods, the orientation feature has been recorded by scanning the orientation feature.

In some methods, the first dental component and the second dental component can have non-circular outer cross-sectional interfaces. For example, the non-circular outer cross-sectional interfaces can include trioval or quadrioval interfaces.

In some instances, the first dental component can be a dental implant or an adapter configured to mate with the dental implant.

In some implementations, creating the second dental component can comprise creating an abutment and/or a prosthesis.

In certain implementations, a replica can be configured to transfer the orientation of a first dental component to a second dental component. The replica can include an external surface comprising a first anti-rotational feature and a second anti-rotational feature. In some implementations, the first anti-rotational feature corresponds to an anti-rotational feature of the first dental component, and the second anti-rotational feature does not correspond to the anti-rotational feature of the first dental component.

In some implementations, the replica can be configured to mate with an anti-rotational feature of a coping to replicate the position and orientation of the first dental component.

In some instances, the replica can be configured to mate with the second dental component via the second anti-rotational feature of the replica, but not via the first anti-rotational feature of the replica.

In some instances, the first anti-rotational feature and/or the second anti-rotational feature of the replica can comprise a protrusion, a recess, a pin, or a groove.

In certain implementations, a multi-unit prosthesis can be configured to align with a dental component. The multi-unit prosthesis can comprise an anti-rotational feature. In some instances, the anti-rotational feature can be configured to mate with an anti-rotational feature of a replica of the dental component. In some instances, the anti-rotational feature of the prosthesis can be configured to not mate with an anti-rotational feature of the dental component.

BRIEF DESCRIPTION OF THE DRAWINGS

FIG. 13A shows an example underlying component.
FIG. 13B shows an example coping.
FIG. 13C shows an example replica.
FIG. 13D shows an example upper component.
FIG. 14A shows an example underlying component.
FIG. 14B shows an example coping.
FIG. 14C shows an example replica.
FIG. 14D shows an example upper component.

DETAILED DESCRIPTION

Figure 1:
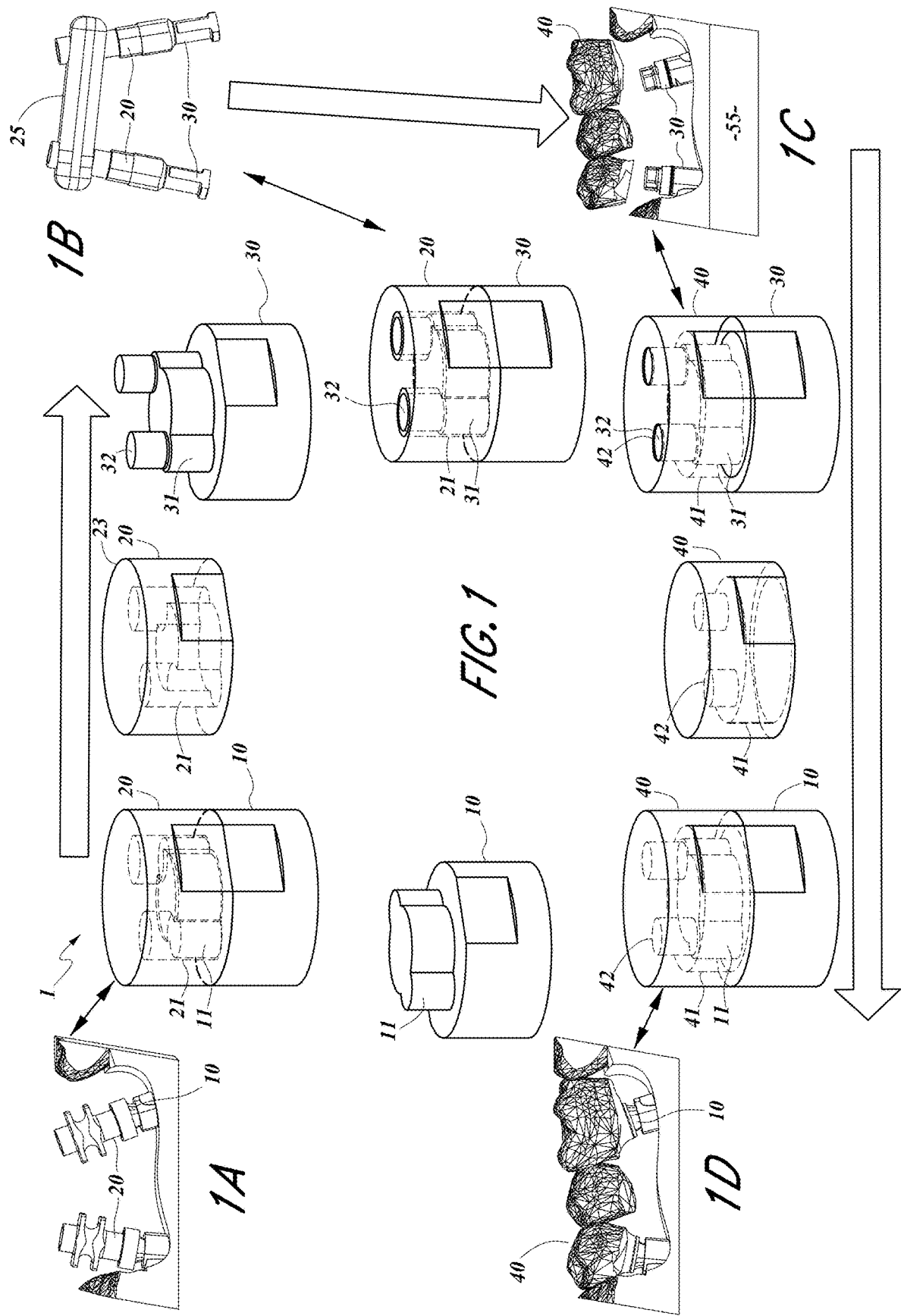
FIG. 1 is a schematic of example dental components together with an example workflow.

FIG. 1 is a schematic of example dental components and of an example workflow. One or more of the dental components can provide a system and/or method to align dental components. One of the components can be an underlying component such as a component implanted in a patient's mouth. As examples, the underlying component can be a dental implant or an intermediate component (e.g., an adapter) coupled with the dental implant. Another component can be an upper or lower component that is to be coupled (directly or indirectly) with the underlying component. For example, the upper component can be an abutment, a prosthesis, or a prosthesis coupled to an abutment. The example system and method can advantageously be used to align dental components that have non-circular outer cross-sectional interfaces (e.g., trioval interfaces, quadrioval interfaces, etc.) and/or multi-unit prostheses (e.g., bridges) also having non-circular outer cross-sectional interfaces.

As an overview, the system 1 (and/or workflow) can include any one or more of the following components: the underlying component 10, a coping 20, a replica 30, and/or an upper component 40. The system 1 can include any one, two, three, or all four of the components alone or in combination with other components. In some instances, the system 1 can be configured to record a position and orientation of the underlying component 10. The underlying component 10 can have an anti-rotational feature 11. In some implementations, the system 1 can include the coping 20. The coping 20 can include an anti-rotational feature 21 that is configured to mate with the anti-rotational feature 11 of the underlying component 10. The coping 20 can also include an orientation feature 23 that is configured to convey the orientation of the underlying component 10. In some implementations, the system 1 can include the replica 30 (e.g., configured to replicate the position and orientation the underlying component 10). The replica 30 can include a first anti-rotational feature 31 and a second anti-rotational feature 32. The first anti-rotational feature 31 can correspond to the anti-rotational feature 11 of the underlying component 10, while the second anti-rotational feature 32 does not correspond to the anti-rotational feature 11 of the underlying component 10. As such, the first anti-rotational feature 31, and not the second anti-rotational feature 32, of the replica 30 can be configured to mate with the anti-rotational feature 21 of the coping 20. In some implementations, the system 1 can include the upper component 40 (e.g., an abutment and/or a prosthesis). The upper component 40 can include an anti-rotational feature 42 that is configured to mate with the second anti-rotational feature 32 of the replica 30, but not with the first anti-rotational feature 31 of the replica 30. In use, the orientation of the underlying component 10 can be transferred to the replica 30 via the anti-rotational feature 21 of the coping 20 and to the upper component 40 via the second anti-rotational feature 32 of the replica 30. As such, the upper component 40 (and/or any component coupled with the upper component 40) can be aligned with the underlying component 10. However, since the upper component 40 does not mate with the first anti-rotation feature 31 of the replica 30, the upper component 40 also does not mate with the first anti-rotational feature 11 of the underlying component 10. As such, "play" can also be provided between the underlying component 10 and the upper component 40.

Each of the components will now be described in more detail.

In some implementations, the system 1 may include the underlying component 10. The underlying component 10 can be a component that is implanted at least partially underlying the gingival line in the patient's mouth. Accordingly, the underlying component 10 is not limited to components coupled to the patient's lower jaw, but can be coupled to the patient's upper jaw. In some implementations, the underlying component 10 can be a dental implant or an intermediate component (e.g., an adaptor or an abutment) configured to mate (e.g., directly or indirectly) with the dental implant. The underlying component 10 can have an anti-rotational feature 11, e.g., configured to mate (e.g., engage or be indexed) with another component to reduce and/or prevent rotational movement between the components. The anti-rotational feature 11 is not particularly limited in number. For example, the anti-rotational feature 11 of the underlying component 10 can have 1, 2, 3, 4, 5, 6, 7, 8, 9, 10, etc. anti-rotational features, or can have a range of anti-rotational features formed by such values (e.g., from 1 to 10 features, etc.).

In FIG. 1, the anti-rotational feature 11 is disposed on an external surface of the underlying component 10. However, the anti-rotational feature 11 can be disposed on an internal surface of the underlying component 10. In some instances, the anti-rotational feature 11 can be disposed on both an external and internal surface of the underlying component 10. The anti-rotational feature 11 is also not particularly limited in shape and size. In the case where the one anti-rotational feature 11 includes more than one anti-rotational feature, one of the anti-rotational features can be the same as another one of the anti-rotational features, or one of the anti-rotational features can be different than another one of the anti-rotational features. The anti-rotational feature 11 can include a protrusion, a recess, a pin, a groove, a snap-fit feature, or the like. In the example shown in FIG. 1, the anti-rotational feature 11 of the underlying component 10 includes two anti-rotational features (e.g., two protrusions) that can mate with coping 20.

In some implementations, the system 1 can include the coping 20. With reference to FIG. 1, the coping 20 has an anti-rotational feature 21 configured to mate with the anti-rotational feature 11 of the underlying component 10. By mating with the anti-rotational feature 11 of the underlying component 10, the coping 20 can convey (and/or transfer) the position and orientation of the underlying component 10 to another component (e.g., via the anti-rotational feature 21). The anti-rotational feature 21 of the coping 20 can be complementary to the anti-rotational feature 11 of the underlying component. In the example shown in FIG. 1, the anti-rotational feature 21 (e.g., two recesses) of the coping 20 can mate with the anti-rotational feature 11 (e.g., two protrusions) of the underlying component 10. Since the anti-rotational feature 21 of the coping 20 can be complementary to the anti-rotational feature 11 of the underlying component 10, similar to the underlying component 10, the anti-rotational feature 21 of the coping 20 is not particularly limited in number. For example, the anti-rotational feature 21 of the coping 20 can include 1, 2, 3, 4, 5, 6, 7, 8, 9, 10, etc. anti-rotational features, or can have a range of anti-rotational features formed by such values (e.g., from 1 to 10 features, etc.).

The anti-rotational feature 21 can be disposed on an internal surface of the coping 20 (e.g., if the anti-rotational feature 11 of the underlying component 10 is on an external surface of the underlying component 10), on an external surface of the coping 20 (e.g., if the anti-rotational feature 11 of the underlying component 10 is on an internal surface of the underlying component 10), or on both an internal and external surface of the coping 20 (e.g., if the anti-rotational feature 11 of the underlying component 10 is on both an external and internal surface of the underlying component 10). In FIG. 1, the anti-rotational feature 21 of the coping 20 is disposed on an internal surface (e.g., to mate with the anti-rotational feature 11 on the external surface of the underlying component 10). The anti-rotational feature 21 is also not particularly limited in shape and size. In the case where the anti-rotational feature 21 includes more than one anti-rotational feature, one of the anti-rotational features can be the same as another one of the anti-rotational features, or one of the anti-rotational features can be different than another one of the anti-rotational features. The anti-rotational feature 21 can include a protrusion, a recess, a pin, a groove, a snap-fit feature, and or like. As described herein, by mating with the anti-rotational feature 11 of the underlying component 10 (e.g., via the anti-rotational feature 21), the coping 20 can convey the position and orientation of the underlying component 10

The coping 20 can also include an orientation feature 23. The orientation feature 23 can be configured to provide the orientation of the coping 20 such that the position and orientation of the underlying component 10 can be captured, for example, in a recording medium. In some instances, the coping 20 can include an impression coping. The impression coping can be configured to be embedded in an impression medium (schematically represented by reference 25 in FIG. 1 at step 1B) to record the position and orientation of the underlying component 10. The impression coping can be a transfer or pick-up type coping. The impression medium can be any of those known in the art or yet to be developed. For example, the impression medium can include a curable resin. In some instances, the coping 20 can include a scan body. The scan body can be configured to be scanned to record the position and orientation of the underlying component 10. The scan body can be scanned using any technique known in the art or yet to be developed. For example, the scan body can be scanned optically. As another example, the scan body can be scanned mechanically.

The orientation feature 23 can include a protrusion, a recess, a pin, a groove, or the like. In some instances, the orientation feature 23 can include an edge of the coping 20. For example, in the example shown in FIG. 1, the coping 20 has an orientation feature 23 comprising an edge of the external surface. In some instances, where the underlying component 10 has a non-round (e.g., non-circular) outer cross sectional interface, the orientation feature can be the outer cross-sectional shape, e.g., a trioval interface, a quadrioval interface, etc. In various implementations, the coping 20 can have an external surface comprising the orientation feature 23. In some implementations, the coping 20 can have an internal surface comprising the orientation feature 23. In some instances, the orientation feature 23 of the coping 20 can be disposed on both an external and internal surface. As described herein, the coping 20 can convey the position and orientation of the underlying component 10 in a recording medium and/or to another component, such as to the replica 30.

With continued reference to FIG. 1, the system 1 may include the replica 30. The replica 30 can be configured to replicate the position and orientation of the underlying component 10 and/or to transfer the orientation of the underlying component 10 to an upper component 40. For example, the replica 30 can include a first anti-rotational feature 31. The first anti-rotational feature 31 can correspond to the anti-rotational feature 11 of the underlying component 10. As such, the first anti-rotational feature 31 of the replica 30 can be configured to mate with the anti-rotational feature 21 of the coping 20 to replicate the position and orientation of the underlying component 10 in the coping 20. Since the first anti-rotational feature 31 of the replica 30 can correspond to the anti-rotational feature 11 of the underlying component 10, the first anti-rotational feature 31 is also not particularly limited in number, shape, and/or size. Also like the anti-rotational feature 11 of the underlying component 10, the first anti-rotational feature 31 of the replica 30 can be disposed on an external surface, on an internal surface, or on both an external and internal surface of the replica 30. The first anti-rotational feature 31 can include a protrusion, a recess, a pin, a groove, a snap-fit feature, or the like.

The replica 30 can also include a second anti-rotational feature 32. The second anti-rotational feature 32 is not particularly limited in number, shape, and/or size. Also, the second anti-rotational feature 32 of the replica 30 can be disposed on an external surface, on an internal surface, or on both an external and internal surface of the replica 30. The second anti-rotational feature 32 can include a protrusion, a recess, a pin, a groove, a snap-fit feature, or the like. In FIG. 1, the second anti-rotational feature 32 of the replica 30 does not correspond to the anti-rotational feature 11 of the underlying component 10, and so does not mate with the anti-rotational feature 21 of the coping 20. As shown in FIG. 1, the second anti-rotational feature 32 of the replica 30 can extend from the first anti-rotational features 31. In some instances, the second anti-rotational feature 32 can be positioned on the first anti-rotational features 31. In some instances, the second anti-rotational feature 32 can be positioned separately from the first anti-rotational feature 31. For example, the second anti-rotational feature 32 can be positioned on a surface configured to mate with an adjacent component (e.g., with the coping 20, the upper component 40, etc.).

By mating with the anti-rotational feature 21 of the coping 20 (e.g., via the first anti-rotational feature 31) and mating with the upper component 40 (e.g., via the second anti-rotational feature 32), the replica 30 can transfer the orientation of the underlying component 10 to the upper component 40. As such, the upper component 40 can align with the underlying component 10. In other words, if the upper component 40 and the underlying component 10 each has a non-round (e.g., non-circular) outer cross sectional interface, both non-round (e.g., non-circular) outer cross sectional interface can be aligned. For some upper components 40, e.g., a multi-unit prosthesis such as a bridge, it may be desirable to provide non-engaging surfaces that can allow some "play" between the upper component 40 and the underlying component 10. For some such cases, as will be described with respect to the upper component 40, the first anti-rotational feature 31 of the replica 30 (which corresponds with the anti-rotational feature 11 of the underlying component 10) can be configured to not mate with the upper component 40.

For example, with continued reference to FIG. 1, the upper component 40 can be a component that is configured to be coupled with the underlying component 10 and implanted above the gingival line in the patient's mouth. Accordingly, the upper component 40 can be a component coupled to the patient's lower jaw or upper jaw. In some implementations, the upper component 40 can be an abutment and/or a prosthesis (e.g., single or multi-unit prosthesis).

Through the transfer of orientation between components, the upper component 40 can be configured to align with the underlying component 10. For example, the first anti-rotational feature 31 of the replica 30 can correspond to the anti-rotational feature 11 of the underlying component 10, and the upper component 40 can be configured to mate with the second anti-rotational feature 32 of the replica 30. In some instances, the underlying component 10 and the upper component 40 can have non-circular outer cross-sectional interfaces, e.g., trioval interfaces, quadrioval interfaces, etc. In some instances (e.g., where the upper component 40 is an intermediate component such as an abutment), a prosthesis can be fabricated to couple with the upper component 40 such that the prosthesis can be aligned with the underlying component 10. As described herein, the upper component 40 can be a multi-unit (or multi-tooth) prosthesis (e.g., a bridge) or can be one or more abutments that can couple to a multi-unit prosthesis. In some such instances, the multi-unit prosthesis can comprise an anti-rotational feature 42. The anti-rotational feature 42 can be configured to mate with the second anti-rotational feature 32 of a replica 30. On the other hand, the anti-rotational feature 42 can be configured to not mate with the first anti-rotational feature 31 of the replica 30 that corresponds to the anti-rotational feature 11 of the underlying component 10. As such, the multi-unit prosthesis can be configured to enter into contact with the underlying component 10 but a "play" at least around one axis, is allowed between the multi-unit prosthesis and the underlying component 10.

As an example of the workflow, the underlying component 10 can be placed in the patient's mouth. The coping 20 (e.g., an impression coping or a scan body) can be positioned to mate with the underlying component 10 (see FIG. 1 at step 1A). In some instances, the anti-rotational feature 21 of the coping 20 can mate with the anti-rotational feature 11 of the underlying component 10. The orientation feature 23 of the coping 20 mated with the underlying component 10 can be recorded to record the position and orientation of the underlying component 10 in relation with its environment (i.e. adjacent teeth and soft tissue). The coping 20 can be unmated from the underlying component 10. The replica 30 can be mated with the coping 20 (e.g., with the recording medium, see 1 at step 1B). The orientation feature 23 can be recorded with respect to the underlying component 10 to convey the position and orientation of the underlying component 10 in the patient's mouth. A model 55 of at least a part of the patient's mouth adjacent the replica 30 mated with the coping 20 can be formed. The coping 20 (e.g., with the recording medium 25) can be unmated from the replica 30, leaving the replica 30 in the model (see FIG. 1 at step 1C). The upper component 40 (e.g., an abutment and/or a prosthesis) can be created such that the upper component 40 can mate with the second anti-rotational feature 32, but not the first anti-rotational feature 31, of the replica 30(see FIG. 1 at step 1C). In this example, since the first anti-rotational feature 31 of the replica 30 can correspond to the anti-rotational feature 11 of the underlying component 10, the upper component 40 also does not mate with the anti-rotational feature 11 of the underlying component 10. Although the upper component 40 can mate with the second anti-rotational feature 32 of the replica 30, since the underlying component 10 does not have a corresponding feature with the second anti-rotational feature 32, the upper component 40 can be configured to not mate with the underlying component 10. After the upper component 40 is fabricated, it can be unmated with the replica 30 and placed on the underlying component 10, aligned but not engaging (see FIG. 1 at step 1D).

Figure 2:
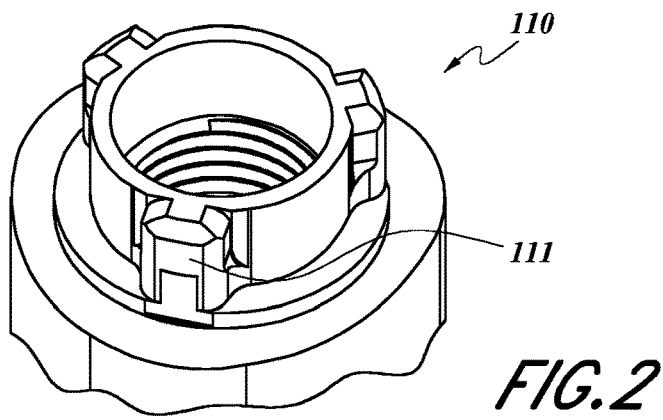
FIG. 2 shows an example underlying component.
Figure 3:
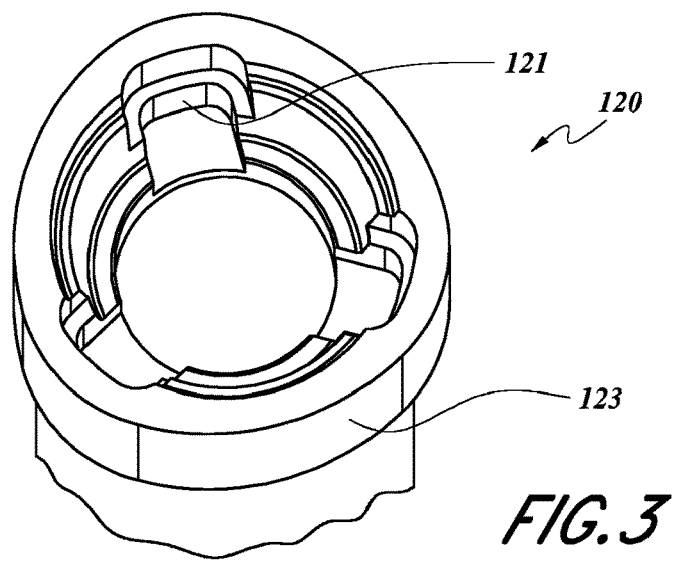
FIG. 3 shows an example coping.
Figure 4:
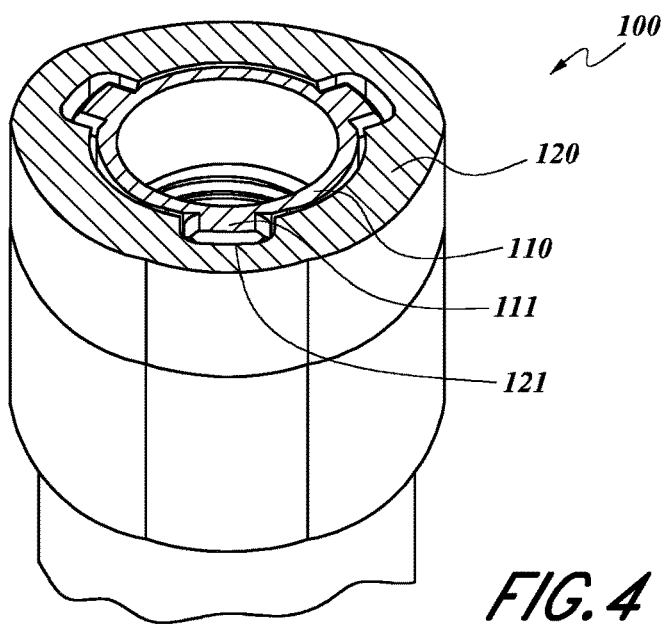
FIG. 4 shows a cross-section of an example underlying component coupled with an example coping.

FIGS. 2-11 shows other example dental components and/or systems 100 which can include any one or more of the following components: an underlying component 110, a coping 120, a replica 130, and/or an upper component (e.g., an abutment and/or prosthesis) 140. FIG. 2 shows an example underlying component 110 having an anti-rotational feature 111 (e.g., three protrusions). The underlying component 110 has a non-round outer shape. FIG. 3 shows an example coping 120 having an anti-rotational feature 121 (e.g., three recesses) which can mate with the anti-rotational feature 111 of the underlying component 110 shown in FIG. 2. The example coping 120 also includes an orientation feature 123 disposed on the side opposite the anti-rotational feature 121. The orientation feature 123 can take the form of non-round outer shape. FIG. 4 shows an example system 100 that can include one of the following components: the example underlying component 110 and/or the example coping 120. FIG. 4 shows a cross-section of the underlying component 110 shown in FIG. 2 coupled with the coping 120 shown in FIG. 3. In FIG. 4, the anti-rotational feature 111 (e.g., three protrusions) on the external surface of the underlying component 110 mates with the anti-rotational feature 121 (e.g., three recesses) on the internal surface of the coping 120 in such a way that the non-round outer shape of the underlying component 110 is aligned with the non-round outer shape of the coping 120. In other words, the relative position between the anti-rotational feature and the non-round outer shape of the underlying component and the relative position between the anti-rotational feature and the non-round outer shape of the coping 120 is defined such that when the anti-rotational feature 111 of the underlying component 110 mates with the anti-rotational feature 121 of the coping 120 their respective non-round outer shape are aligned.

Figure 5:
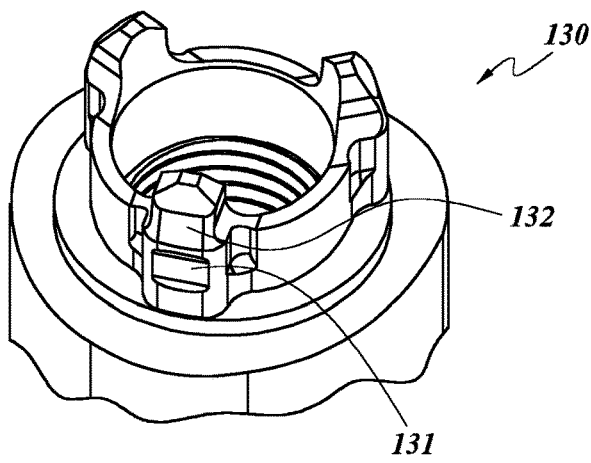
FIG. 5 shows an example replica.
Figure 6:
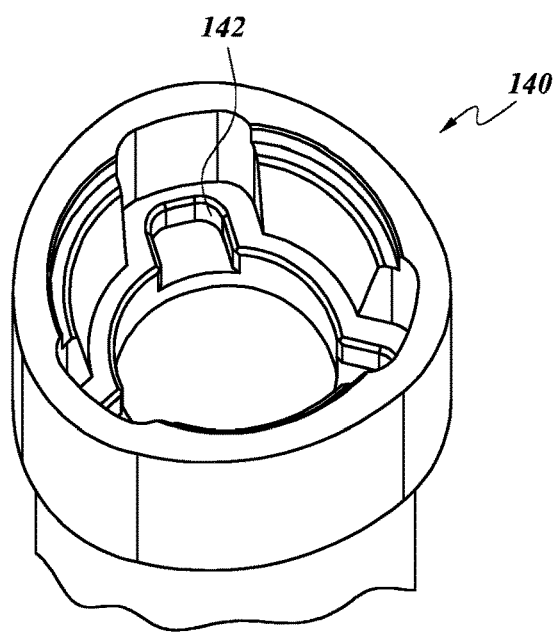
FIG. 6 shows an example upper component.
Figure 7:
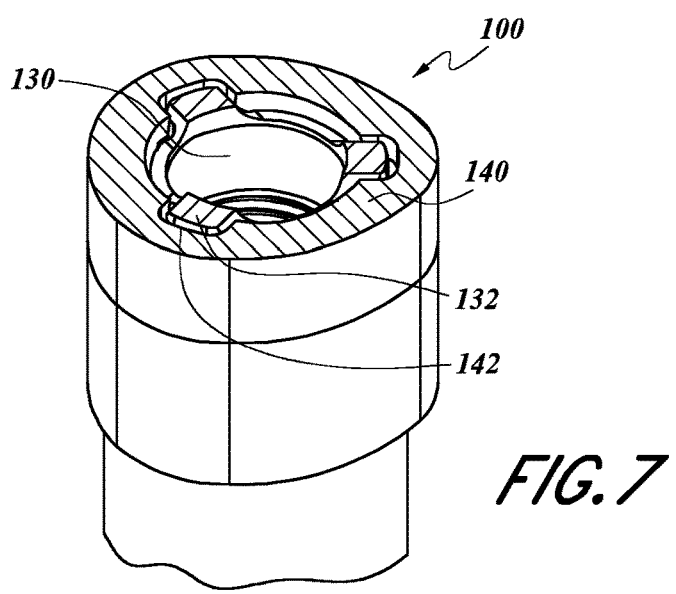
FIG. 7 shows a cross-section of an example replica coupled with an example upper component.

FIG. 5 shows an example replica 130 that is configured to replicate the position and orientation of an underlying component (e.g., underlying component 110 shown in FIG. 2). The replica 130 has a first anti-rotational feature 131 that can correspond to an anti-rotational feature of the underlying component (e.g., anti-rotational feature 111 of the underlying component 110 shown in FIG. 2). The anti-rotational feature 131 of the replica 130 shown in FIG. 5 and the anti-rotational feature 111 of the underlying component 110 shown in FIG. 2 are both in the shape of 3 protrusions, even though the exact shapes can differ. For example, the outer shape can appear similar, while the first anti-rotational feature 131 of the replica 130 can include a recessed portion in the center of a protrusion. As shown in FIG. 5, the replica 130 can also have a second anti-rotational feature 132. The second anti-rotational feature 132 can extend from the first anti-rotational feature 131 and can be different in shape and/or size than the first anti-rotational feature 131. FIG. 6 shows an example upper component 140 (e.g., an abutment) having an anti-rotational feature 142 (e.g., three recesses) which can mate with the second anti-rotational feature of a replica (e.g., second anti-rotational feature 132 of the replica 130 shown in FIG. 5). FIG. 7 shows an example system 100 that can include one of the following components: the example replica 130 and/or the example upper component 140. FIG. 7 shows a cross-section of the replica 130 shown in FIG. 5 coupled with the upper component 140 shown in FIG. 6. In FIG. 7, the anti-rotational feature 142 (e.g., three recesses) on the internal surface of the upper component 140 mates with the second anti-rotational feature 132 (e.g., three protrusions) on the external surface of the replica 130 in such a way that the non-round outer shape of the upper component is aligned with the non-round outer shape of the of the replica 130.

In other words, the relative position between the anti-rotational feature and the non-round outer shape of the upper component 140 and the relative position between the second anti-rotational feature and the non-round outer shape of the replica 120 is defined such that, when the anti-rotational feature 142 of the upper component 140 mates with the second anti-rotational feature 132 of the replica 130, their respective non-round outer shape are aligned.

Figure 8:
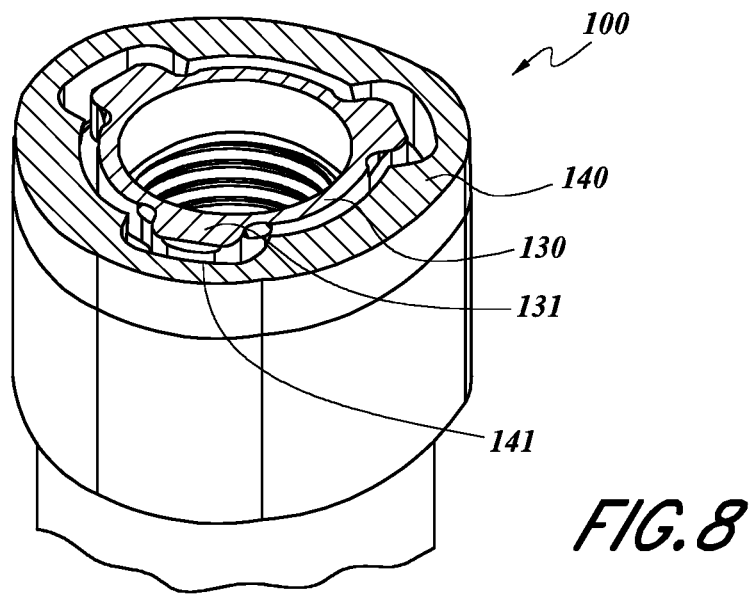
FIG. 8 shows another cross-section of the example replica coupled with the example upper component shown in FIG. 7.
Figure 9:
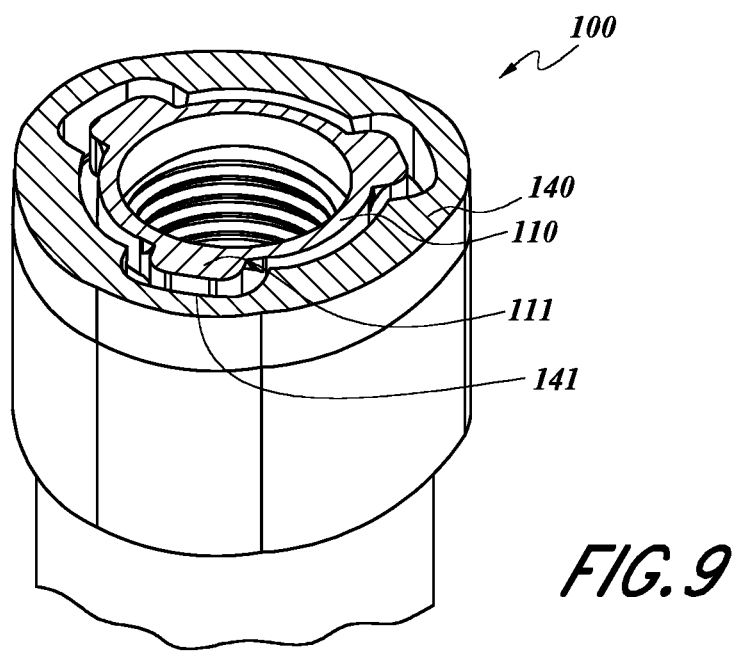
FIG. 9 shows a cross-section of an example underlying component coupled with an example upper component.

FIG. 8 shows another cross-section of the example replica 130 shown in FIG. 5 coupled with the example upper component 140 shown in FIG. 6. The first anti-rotational feature 131 (e.g., three protrusions) on the external surface of the replica 130 however does not mate with the internal surface of the upper component 140 (e.g., feature 141). In some instances, the feature 141 (e.g., 3 recesses) of the upper component 140 can have a larger size (e.g., compared with the first anti-rotational feature 131 of the replica 130), or the first anti-rotational feature 131 of the replica 130 can have a smaller size compared to the feature 141. Since the first anti-rotational feature 131 of the replica (which can correspond to the anti-rotational feature 111 of the underlying component 110) does not mate with the upper component 140, the anti-rotational feature 111 of the underlying component 110 also does not mate with the upper component 140. FIG. 9 shows a cross-section of the example underlying component 110 shown in FIG. 2 coupled with the example upper component 140 shown in FIG. 6. The anti-rotational feature 111 (e.g., three protrusions) on the external surface of the underlying component 110 does not mate with the feature 141 (e.g., 3 recesses) on the internal surface of the upper component 140.

Figure 10:
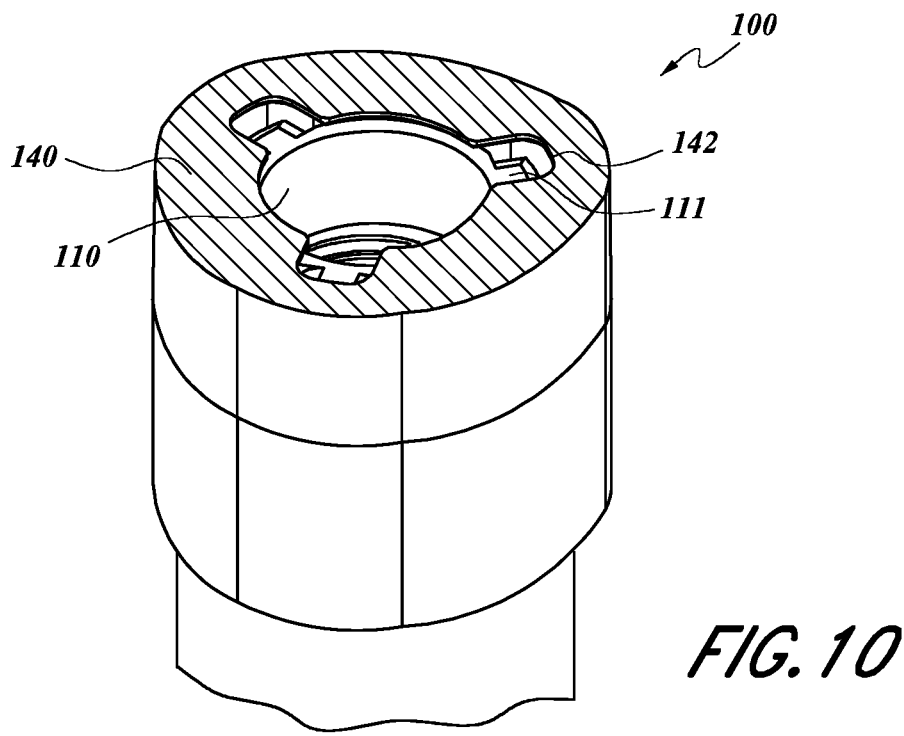
FIG. 10 shows another cross-section of the example underlying component coupled with the example upper component shown in FIG. 9.
Figure 11:
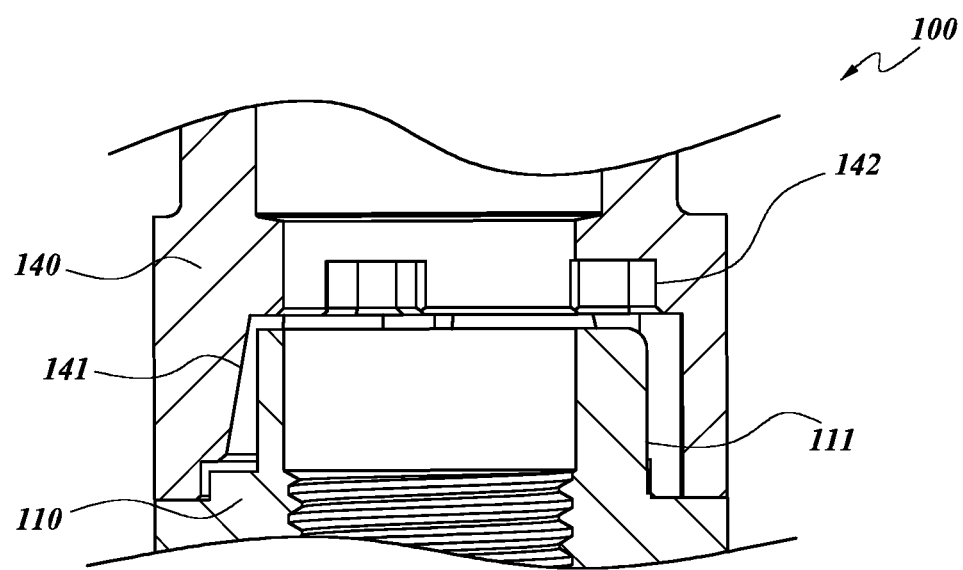
FIG. 11 shows a longitudinal cross-section of the example underlying component coupled with the example upper component shown in FIG. 9.

FIG. 10 shows another cross-section of the example underlying component 110 shown in FIG. 2 coupled with the example upper component 140 shown in FIG. 6. FIG. 11 shows a longitudinal cross-section of the example underlying component 110 shown in FIG. 2 coupled with the example upper component 140 shown in FIG. 6. As shown in FIGS. 10 and 11, the anti-rotational feature 111 of the underlying component 110 does not reach the anti-rotational feature 142 of the upper component 140. FIG. 11 also shows the anti-rotational feature 111 on the external surface of the underlying component 110 does not mate with the feature 141 on the internal surface of the upper component 140.

Figure 12A:
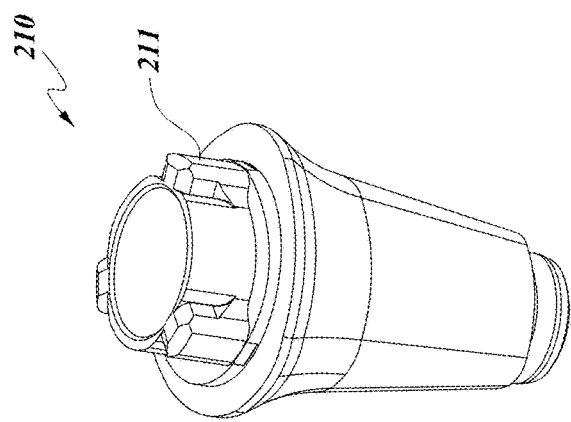
FIG. 12A shows an example underlying component.
Figure 12B:
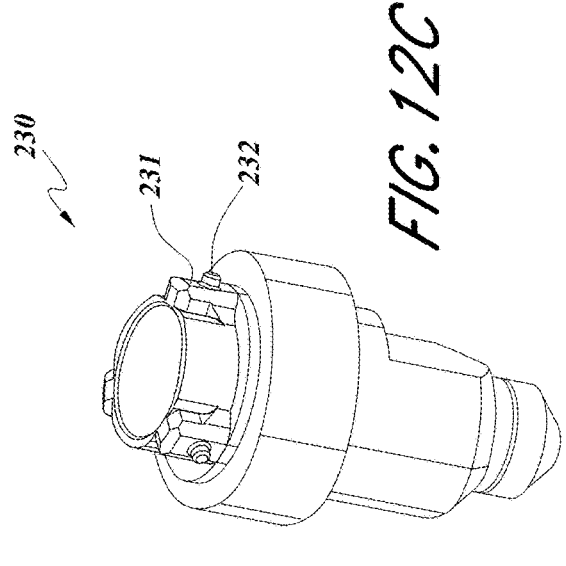
FIG. 12B shows an example coping.

FIGS. 12A-12D show other example dental components and/or systems which can include any one or more of the components. FIG. 12A shows an example underlying component 210 having an anti-rotational feature 211 (e.g., three protrusions). FIG. 12B shows an example coping 220. The coping 220 can include an anti-rotational feature 221 (e.g., three recesses) configured to mate with the anti-rotational feature 211 of the underlying component 210. In this example, the coping 220 also includes a cut free 222 to avoid engagement with a second anti-rotational feature 232 of the replica. The coping 220 also can include an orientation feature 223 (e.g., protrusions and recesses). The orientation feature 223 can provide the orientation of the coping 220 such that the position and orientation of the underlying component 210, when mated, can be captured.

Figure 12C:
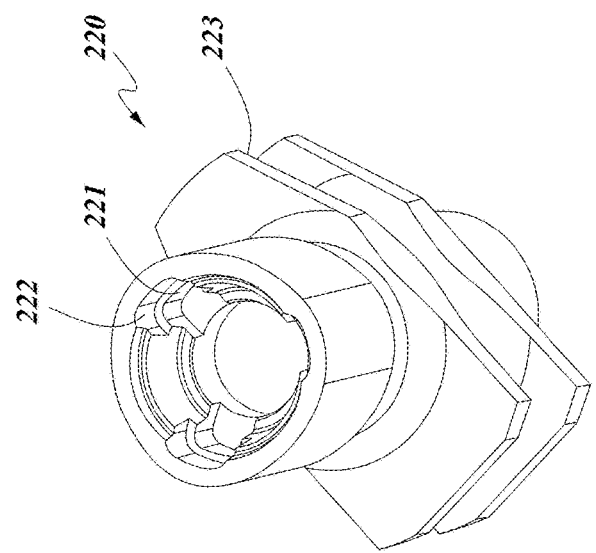
FIG. 12C shows an example replica.
Figure 12D:
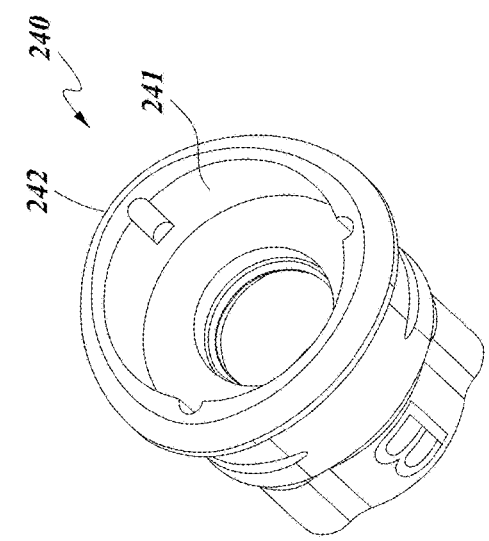
FIG. 12D shows an example upper component.

FIG. 12C shows an example replica 230 that is configured to replicate the position and orientation the underlying component 210 shown in FIG. 12A. The replica 230 has a first anti-rotational feature 231 (e.g., 3 protrusions) that corresponds to the anti-rotational feature 211 of the underlying component 210. The replica 230 can also have a second anti-rotational feature 232 (e.g., 3 smaller protrusions or pins). In this example, the second anti-rotational feature 232 is positioned on the first anti-rotational feature 231. FIG. 12D shows an example upper component 240. The upper component 240 has an anti-rotational 242 (e.g., 3 recesses) which can mate with the second anti-rotational feature 232, but not with the first anti-rotational feature 231 of the replica 230 (e.g., feature/surface 241).

FIGS. 13A-13D show other example dental components and/or systems which can include any one or more of the components. FIG. 13A shows an example underlying component 310 having an anti-rotational feature 311 (e.g., three protrusions). FIG. 13B shows an example coping 320. The coping 320 can include an anti-rotational feature 321 (e.g., three recesses) configured to mate with the anti-rotational feature 311 of the underlying component 310. The coping 320 also can include an orientation feature 323 (e.g., protrusions and recesses). FIG. 13C shows an example replica 330 that is configured to replicate the position and orientation the underlying component 310 shown in FIG. 13A. The replica 330 has a first anti-rotational feature 331 that corresponds to the anti-rotational feature 311 of the underlying component 310. The replica 330 can also have a second anti-rotational feature 332 (e.g., a smaller protrusion or pin). In this example, the second anti-rotational feature 332 is positioned on a surface configured to mate with an adjacent component (e.g., a coping, an abutment, a prosthesis, etc.). The coping 320 in FIG. 13B does not include an additional anti-rotational feature to mate with the second anti-rotational feature 332 of the replica 330 shown in FIG. 13C. FIG. 13D shows an example upper component 340. The upper component 340 has an anti-rotational 342 (e.g., a recess) which can mate with the second anti-rotational feature 332 of the replica 330. The upper component 340 does not mate with the first anti-rotational feature 331 of the replica 330 (e.g., feature/surface 341).

Figure 14G:
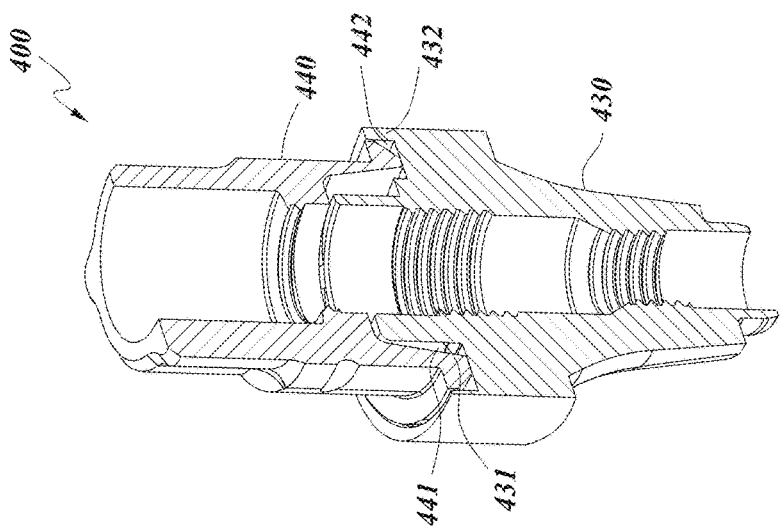
FIG. 14G shows another cross-section of the example replica coupled with the example upper component shown in FIG. 14E.

FIGS. 14A-14G show other example dental components and/or systems 400 which can include any one or more of the components. FIG. 14A shows an example underlying component 410 having an anti-rotational feature 411 (e.g., three protrusions). FIG. 14B shows an example coping 420. The coping 420 can include an anti-rotational feature 421 (e.g., three recesses) configured to mate with the anti-rotational feature 411 of the underlying component 410. The coping 420 also can include an orientation feature 423 (e.g., protrusions and recesses). FIG. 14C shows an example replica 430 that is configured to replicate the position and orientation the underlying component 410 shown in FIG. 14A. The replica 430 has a first anti-rotational feature 431 (e.g., 3 protrusions) that corresponds to the anti-rotational feature 411 of the underlying component 410. The replica 430 can also have a second anti-rotational feature 432. In this example, the second anti-rotational feature 432 is a grooved surface configured to mate with an adjacent component (e.g., a coping, an abutment, a prosthesis, etc.). The coping 420 in FIG. 14B does not include an additional anti-rotational feature to mate with the second anti-rotational feature 432 of the replica 430 shown in FIG. 14C. FIG. 14D shows an example upper component 440. The upper component 440 has an anti-rotational 442 which can mate with the second anti-rotational feature 432, but not with the first anti-rotational feature 431 of the replica 430 (e.g., feature/surface 441).

Figure 14F:
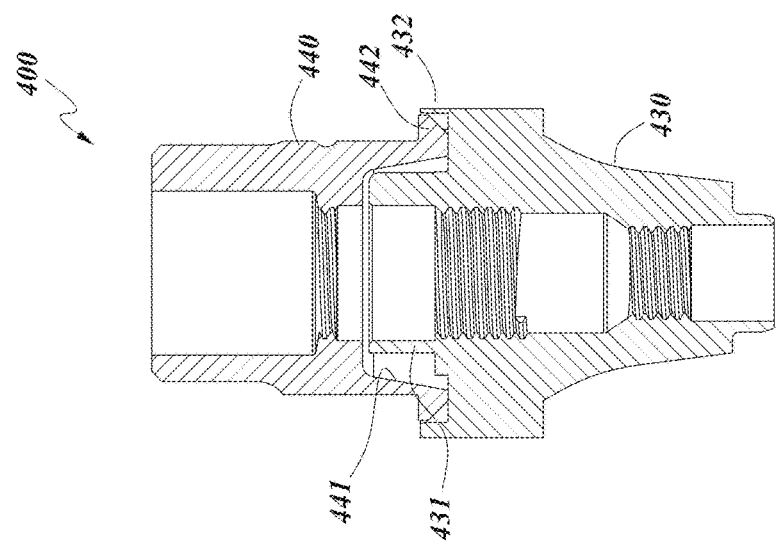
FIG. 14F shows a cross-section of the example replica coupled with the example upper component shown in FIG. 14E.
Figure 14E:
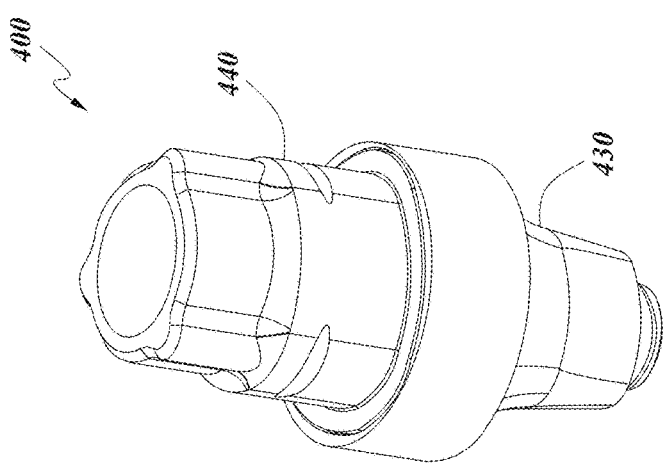
FIG. 14E shows the example replica shown in FIG. 14C coupled with the example upper component shown in FIG. 14D.

FIG. 14E shows the example replica 430 shown in FIG. 14C coupled with the example upper component 440 shown in FIG. 14D. FIG. 14F shows a cross-section of the example replica 430 coupled with the example upper component 440 shown in FIG. 14E. FIG. 14G shows another cross-section of the example replica 430 coupled with the example upper component 440 shown in FIG. 14E. As shown in FIGS. 14F and 14G, the second anti-rotational feature of the 432 of the replica 430 can be configured to mate with the anti-rotational feature 442 of the upper component 440. However, the upper component 440 (e.g., surface/feature 441) does not mate with the first anti-rotational feature 431 of the replica 430.

Other examples are possible.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims. In particular, the upper component can also be a lower component depending on the jaw that it is intended to be attached to.

LISTING OF EXAMPLES

1. A system configured to record a position and orientation of a dental component, the system comprising:
    a coping comprising:
        an anti-rotational feature that is configured to mate with an anti-rotational feature of a dental component, and
        an orientation feature that is configured to convey the orientation of the dental component; and
    a replica comprising:
        a first anti-rotational feature that corresponds to the anti-rotational feature of the dental component, and
        a second anti-rotational feature that does not correspond to the anti-rotational feature of the dental component.
2. The system of Example 1,
    wherein the coping comprises an impression coping that is configured to be embedded in an impression medium to record the position and orientation of the dental component, or
    wherein the coping comprises a scan body that is configured to be scanned to record the position and orientation of the dental component.
3. The system of any of the preceding examples, wherein the coping comprises:
    an external surface comprising the orientation feature; and
    an internal surface comprising the anti-rotational feature, wherein preferably the orientation feature and/or the anti-rotational feature of the coping comprise a protrusion, a recess, a pin, or a groove.

4. The system of any of the preceding examples, wherein the second anti-rotational feature of the replica is positioned on the first anti-rotational feature of the replica.

5. The system of any of the preceding examples, wherein the second anti-rotational feature of the replica is positioned on a surface configured to mate with an adjacent component, wherein preferably the adjacent component comprises the coping, an abutment, and/or a prosthesis.

6. The system of any of the preceding examples, wherein the first anti-rotational feature and/or the second anti-rotational feature of the replica comprise a protrusion, a recess, a pin, or a groove.

7. The system of any of the preceding examples, further comprising the dental component, wherein preferably the dental component comprises a dental implant or an adapter configured to mate with the dental implant.

8. The system of any of the preceding examples, wherein the system is configured to align the dental component with another dental component, wherein preferably the dental components have non-circular outer cross-sectional interfaces, for example trioval or quadrioval interfaces.

9. The system of Example 8, further comprising the another dental component, wherein the another dental component is configured to mate with the second anti-rotational feature of the replica, but not with the first anti-rotational feature of the replica, wherein preferably the another dental component comprises an abutment and/or a prosthesis.

10. A method of fabricating a second dental component that is configured to align with a first dental component in a patient's mouth, the method comprising:
mating at least one replica with a coping, wherein the coping has an orientation feature that has been recorded with respect to the first dental component to convey the position and orientation of the first dental component in the patient's mouth, the replica comprising a first anti-rotational feature that corresponds to an anti-rotational feature of the first dental component, the replica further comprising a second anti-rotational feature that does not correspond to the anti-rotational feature of the first dental component;
forming a model of at least a part of the patient's mouth adjacent the replica mated with the coping;
unmating the coping from the replica; and
creating the second dental component such that the second dental component is configured to mate with the second anti-rotational feature of the replica, but not with the first anti-rotational feature of the replica.

11. The method of Example 10, further comprising:
mating the coping with the first dental component, the coping comprising an anti-rotational feature configured to mate with the anti-rotational feature of the first dental component;
recording the orientation feature of the coping mated with the first dental component to record the position and orientation of the first dental component; and
unmating the coping from the first dental component.

12. The method of Example 10 or 11, wherein the orientation feature has been recorded by embedding the orientation feature in an impression medium or by scanning the orientation feature.

13. The method of any of Examples 10-12, wherein the first dental component and the second dental component have non-circular outer cross-sectional interfaces, for example trioval or quadrioval interfaces.

14. The method of any of Examples 10-13, wherein the first dental component is a dental implant or an adapter configured to mate with the dental implant.

15. The method of any of Examples 10-14, wherein creating the second dental component comprises creating an abutment and/or a prosthesis.

16. A replica configured to transfer the orientation of a first dental component to a second dental component, the replica comprising:
an external surface comprising a first anti-rotational feature and a second anti-rotational feature,
wherein the first anti-rotational feature corresponds to an anti-rotational feature of the first dental component, and
wherein the second anti-rotational feature does not correspond to the anti-rotational feature of the first dental component.

17. The replica of Example 16, wherein the replica is configured to mate with an anti-rotational feature of a coping to replicate the position and orientation of the first dental component in the coping.

18. The replica of any of Examples 16-17, wherein the replica is configured to mate with the second dental component via the second anti-rotational feature of the replica, but not via the first anti-rotational feature of the replica.

19. The replica of any of Examples 16-18, wherein the first anti-rotational feature and/or the second anti-rotational feature of the replica comprise a protrusion, a recess, a pin, or a groove.

A multi-unit prosthesis configured to align with a dental component, the multi-unit prosthesis comprising an anti-rotational feature.

20. The multi-unit prosthesis of Example 20, wherein the anti-rotational feature is configured to mate with an anti-rotational feature of a replica of the dental component.

21. The multi-unit prosthesis of Example 20 or 21, wherein the anti-rotational feature is configured to not mate with an anti-rotational feature of the dental component.

What is claimed is:

1. A system configured to record a position and an orientation of a dental component, the system comprising:
a coping comprising:
an anti-rotational feature that is configured to mate with an anti-rotational feature of the dental component, and
an orientation feature that is configured to convey the orientation of the dental component; and
a replica configured to replicate the position and the orientation of the dental component in relation to adjacent teeth or soft tissue, the replica comprising:
a first anti-rotational feature that corresponds to the anti-rotational feature of the dental component, the first anti-rotational feature configured to mate with the anti-rotational feature of the coping, and
a second anti-rotational feature that does not correspond to the anti-rotational feature of the dental component.

2. The system of claim 1, wherein the coping comprises an impression coping that is configured to be embedded in an impression medium to record the position and orientation of the dental component, or
wherein the coping comprises a scan body that is configured to be scanned to record the position and orientation of the dental component.

3. The system of claim 1, wherein the coping comprises:
an external surface comprising the orientation feature; and
an internal surface comprising the anti-rotational feature, wherein at least one of the orientation feature and the anti-rotational feature of the coping comprise a protrusion, a recess, a pin, or a groove.

4. The system of claim 1, wherein the second anti-rotational feature of the replica is positioned on the first anti-rotational feature of the replica.

5. The system of claim 1, wherein the second anti-rotational feature of the replica protrudes from a surface configured to mate with an adjacent component, wherein the adjacent component comprises at least one of the coping, an abutment, and a prosthesis.

6. The system of claim 1, wherein at least one of the first anti-rotational feature and the second anti-rotational feature of the replica comprise a protrusion, a recess, a pin, or a groove.

7. The system of claim 1, further comprising the dental component, wherein the dental component comprises a dental implant or an adapter configured to mate with the dental implant.

8. The system of claim 1, wherein the system is configured to align the dental component with another dental component, wherein the dental component and the another dental component have non-circular outer cross-sectional interfaces.

9. The system of claim 8, further comprising the another dental component, wherein the another dental component is configured to mate with the second anti-rotational feature of the replica, but not with the first anti-rotational feature of the replica, wherein the another dental component comprises at least one of an abutment and a prosthesis.

10. A method of fabricating a second dental component that is configured to align with a first dental component in a patient's mouth, the method comprising:
mating a replica with a coping, wherein the coping has an orientation feature that has been recorded with respect to the first dental component to convey a position and an orientation of the first dental component in relation to adjacent teeth or soft tissue, the replica comprising a first anti-rotational feature that corresponds to an anti-rotational feature of the first dental component, the first anti-rotational feature configured to mate with the anti-rotational feature of the coping, the replica further comprising a second anti-rotational feature that does not correspond to the anti-rotational feature of the first dental component;
forming a model of at least a part of the patient's mouth adjacent the replica mated with the coping;
unmating the coping from the replica; and
creating the second dental component such that the second dental component is configured to mate with the second anti-rotational feature of the replica, but not with the first anti-rotational feature of the replica.

11. The method of claim 10, further comprising:
mating the coping with the first dental component, the coping comprising an anti-rotational feature configured to mate with the anti-rotational feature of the first dental component;
recording the orientation feature of the coping mated with the first dental component to record the position and orientation of the first dental component; and
unmating the coping from the first dental component.

12. The method of claim 10, wherein the orientation feature has been recorded by embedding the orientation feature in an impression medium or by scanning the orientation feature.

13. The method of claim 10, wherein the first dental component and the second dental component have non-circular outer cross-sectional interfaces.

14. The method of claim 10, wherein the first dental component is a dental implant or an adapter configured to mate with the dental implant.

15. The method of claim 10, wherein creating the second dental component comprises creating at least one of an abutment and a prosthesis.

16. The method of claim 10, wherein unmating the coping from the replica comprises unmating the coping from the replica such that the replica remains in the model.

17. The system of claim 1, wherein the second anti-rotational feature of the replica comprises a pin, the pin protruding from a surface configured to mate with an adjacent component.

18. The system of claim 8, wherein the non-circular outer cross-sectional interfaces are trioval or quadrioval interfaces.

19. The method of claim 13, wherein the non-circular outer cross-sectional interfaces are trioval or quadrioval interfaces.

* * * * *